US011274700B2

United States Patent
Lorenz et al.

(10) Patent No.: US 11,274,700 B2
(45) Date of Patent: Mar. 15, 2022

(54) CURABLE COMPOSITE BUSH

(71) Applicant: Airbus Operations GmbH, Hamburg (DE)

(72) Inventors: Florian Lorenz, Bremen (DE); Dustin Shapi, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 432 days.

(21) Appl. No.: 16/139,220

(22) Filed: Sep. 24, 2018

(65) Prior Publication Data

US 2019/0162232 A1    May 30, 2019

(30) Foreign Application Priority Data

Nov. 28, 2017    (GB) .................................... 1719791

(51) Int. Cl.
| | | |
|---|---|---|
| *B60G 11/18* | (2006.01) | |
| *F16C 33/20* | (2006.01) | |
| *B64C 3/50* | (2006.01) | |

(52) U.S. Cl.
CPC .......... *F16C 33/201* (2013.01); *F16C 33/208* (2013.01); *B64C 3/50* (2013.01); *F16C 2208/04* (2013.01); *F16C 2208/82* (2013.01)

(58) Field of Classification Search
CPC .... F16F 9/32; F16F 9/38; B60G 11/22; B60G 11/26; B60G 11/18
USPC ...................... 267/64.27, 122, 127, 149, 153
See application file for complete search history.

(56) References Cited

U.S. PATENT DOCUMENTS

| | | | | |
|---|---|---|---|---|
| 1,384,178 | A * | 7/1921 | Casgrain ................ | A43D 87/00 12/47 |
| 2,857,189 | A * | 10/1958 | Howard .................. | B29C 43/02 267/141.3 |
| 2,931,412 | A * | 4/1960 | Wing .................... | F16D 1/0835 411/108 |
| 3,321,200 | A * | 5/1967 | Polhemus ............. | F16F 9/0409 267/64.27 |
| 3,353,813 | A * | 11/1967 | Erdmann ............. | B60G 17/044 267/218 |
| 3,964,807 | A | 6/1976 | White | |
| 4,235,427 | A * | 11/1980 | Bialobrzeski ........... | F16F 1/424 267/153 |

(Continued)

FOREIGN PATENT DOCUMENTS

DE    4130823 A1    3/1993

OTHER PUBLICATIONS

Combined Search and Examination Report for corresponding application No. GB1719791.4, dated May 8, 2018.

*Primary Examiner* — Christopher P Schwartz

(74) *Attorney, Agent, or Firm* — Greer, Burns & Crain, Ltd.

(57) ABSTRACT

A curable composite bush for an aircraft joint comprising a generally hollow cylindrical body formed from a matrix material impregnated with a reinforcement material substantially composed of fibers, the fibers being oriented in a generally circumferential direction about a longitudinal axis of the bush. The body may define a plurality of corrugations extending between an inner and an outer diameter of the bush to improve the compressibility of the bush in a direction substantially collinear to a longitudinal axis of the bush.

19 Claims, 9 Drawing Sheets

(56) References Cited

U.S. PATENT DOCUMENTS

| | | | | |
|---|---|---|---|---|
| 5,065,988 A | * | 11/1991 | Wedell | F16F 1/00 |
| | | | | 267/149 |
| 5,413,374 A | * | 5/1995 | Pierce | B60G 7/00 |
| | | | | 267/141.2 |
| 5,954,168 A | * | 9/1999 | Nakatani | F16F 9/38 |
| | | | | 188/322.12 |
| 6,082,721 A | * | 7/2000 | Kingsley | F16B 11/008 |
| | | | | 267/276 |
| 6,357,377 B1 | * | 3/2002 | Santelli, Jr. | B63B 59/02 |
| | | | | 114/219 |
| 6,461,695 B1 | * | 10/2002 | Schaap | B29C 70/205 |
| | | | | 156/192 |
| 7,163,369 B2 | * | 1/2007 | Bruce | F04D 29/563 |
| | | | | 415/160 |
| 8,794,840 B1 | * | 8/2014 | Kellar | F16C 17/18 |
| | | | | 384/129 |
| 9,533,342 B1 | * | 1/2017 | Kennedy | B29C 35/02 |
| 2009/0028696 A1 | * | 1/2009 | Gannett | F04D 29/047 |
| | | | | 415/174.2 |
| 2012/0104672 A1 | * | 5/2012 | Chervin | F16F 1/3732 |
| | | | | 267/292 |
| 2013/0087381 A1 | * | 4/2013 | Daughtry | F16L 25/0054 |
| | | | | 174/660 |
| 2014/0252743 A1 | * | 9/2014 | Pielock | B60G 17/0485 |
| | | | | 280/124.157 |
| 2019/0162233 A1 | * | 5/2019 | Lorenz | B64F 5/10 |

* cited by examiner

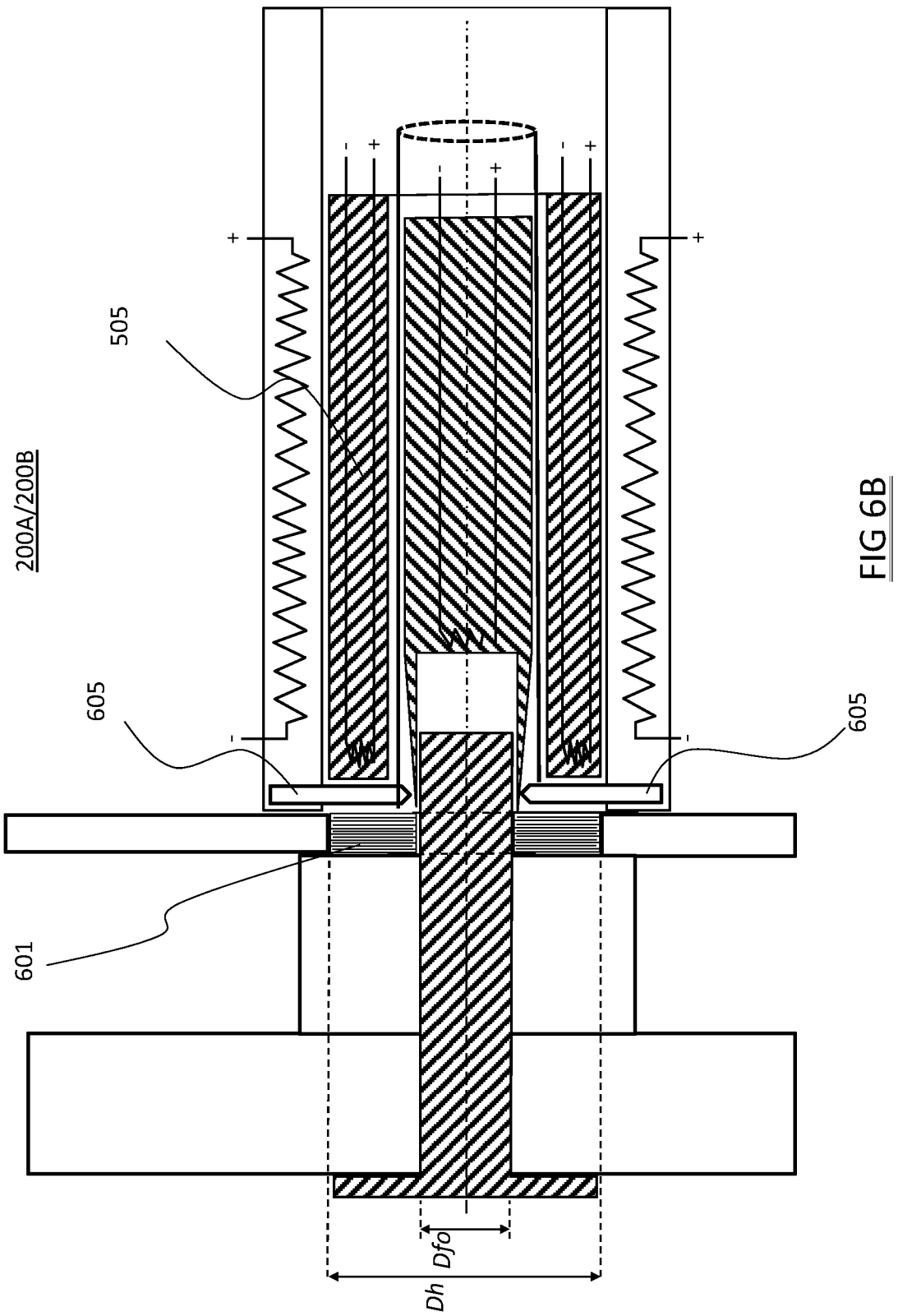

CURABLE COMPOSITE BUSH

CROSS-REFERENCES TO RELATED APPLICATIONS

This application claims the benefit of the Great Britain Patent Application No. 1 719 791.4 filed on Nov. 28, 2017, the entire disclosure of which is incorporated herein by way of reference.

FIELD OF INVENTION

The present invention relates to a curable composite bushing for an aircraft joint, an aircraft joint, an aircraft structural assembly incorporating such an aircraft joint and a method and tool for installing a curable composite bushing.

BACKGROUND TO THE INVENTION

During aircraft structural assembly, it is known to attach two or more components together at a joint by drilling and installing one or more fasteners in predetermined hole positions after the components are mounted at a fixed position relative one another. Once the fasteners are installed the joint is made and a larger structural assembly is formed. It is known that solid bushings or bushes can be used during the assembly of structural joints and assemblies. They are used when unintended eccentricity or gaps exist between a fastener and a corresponding hole into to which the fastener is placed, needs to be removed in order to ensure correct fit of the fastener. Normally a solid bush is machined from a blank or selected from a range of pre-machined solid bushes and then fitted with an interference fit within the existing bore. The solid bush may then be drilled in the desired position to provide a corrected bore into which the bolt is installed.

In the assembly of aircraft structures, machining and drilling of made to order solid bushing parts to the required accuracy is a precision process and therefore takes time and requires a stop in the assembly, therefore increasing overall costs of the assembly process.

Sometimes the prepared solid bushing or the hole may not correspond to the dimensions of the hole exactly due to hidden irregularities in the surface of the hole itself, which results in a poor seating of the fastener when installed in the hole. Incorrect seating of the fastener in the hole results in the fastener not transferring the applied load fully when the aircraft is in operation, which has static and fatigue implications. Therefore, an aircraft structure may be designed with a conservative assumption that a certain number of fasteners in a structural assembly would be incorrectly seated fasteners. This conservative approach ultimately leads to a design with a higher number of fasteners required to transfer a given load, thus leading to a higher degree of redundancy, however, the structural assembly will also be more costly to manufacture, heavier and require more maintenance due to the increased attachment part count. Furthermore, in some cases the hole may be so irregular that redundancy will not suffice for the degree of incorrect seating of the fastener, leading to the hole and the solid bushing needing to be reworked and or even the component to be scrapped. In addition, the use of solid bushings of various sizes requires storage and asset management, which takes up space of the assembly floor and resources. Furthermore, the process of fitting a solid bush into the existing bore may itself result in damage to the assembly, particularly in the case of composites. This again may require rework which can be time consuming and therefore can increase costs.

An object of the present invention is therefore to provide a bushing and an aircraft joint incorporating the bushing that is more efficient to build, cheaper to use and less likely to cause damage. A further object is to provide an aircraft structure assembly incorporating one or more joints with bushing in order to decrease assembly time of the structural assembly.

Another object of the present invention is to provide a tooling configured to install a bushing according to the object of the technology previously described. Lastly, it is also an object of the present invention to provide a standard sized bushing that is adaptable to fit multiple dimensions of a hole without machining, and furthermore, a standard bushing that is quicker to install and easier to store than those previously known.

SUMMARY OF THE INVENTION

According to at least one embodiment of the present invention, there is provided a curable composite bush for an aircraft joint comprising a generally hollow cylindrical body formed from a matrix material impregnated with a reinforcement material substantially composed of fibers, the fibers being oriented in a generally circumferential direction about a longitudinal axis of the bush. The body of the bush may define a plurality of corrugations extending between an inner and an outer diameter of the bush, and wherein the corrugations improve the compressibility of the bush in a direction substantially collinear to a longitudinal axis of the bush. The corrugations may be substantially chevron shaped in an uncompressed state. The corrugations may be substantially sinusoidal shaped in an uncompressed state. One or more of the corrugations may extend in the form of a helix along the length of the curable composite bush. Furthermore, the cross section of the bush may vary along the length of the bush.

The matrix material of the composite bush may substantially comprise a thermoplastic type of material. The thermoplastic matrix material may be polyether ether ketone. Alternatively, the matrix material may comprise a thermoset type of material.

The reinforcement fibers may be substantially continuous or substantially discontinuous and the reinforcement material may comprise fibers of more than one type of reinforcement fiber. In addition, the reinforcement fibers may be evenly distributed throughout the body of the composite bush. The reinforcement fibers may be formed from a glass fiber material, such as E-glass fiber material. The reinforcement fibers may be formed from a graphite fiber material or an aramid fiber material. A composite bush may be provided with a half-length of the corrugation in an uncompressed state between 0.5 mm and 3 mm. The inner diameter of the bush in an uncompressed state may be between 4 mm and 30 mm. The inner diameter of the bush may be approximately 10 mm and the thickness may be approximately 0.5 mm.

Advantages of the present invention will now become apparent from the detailed description with appropriate reference to the accompanying drawings.

BRIEF DESCRIPTION OF THE DRAWINGS

Embodiments of the invention will now be described, by way of example only, with reference to the following drawings in which:

FIGS. 6A and 6B shows an aircraft joint of FIG. 2 at a first joining stage and a second joining stage, respectively, using a further type of curable composite bush and installation tool.

DETAILED DESCRIPTION

Figure 1:
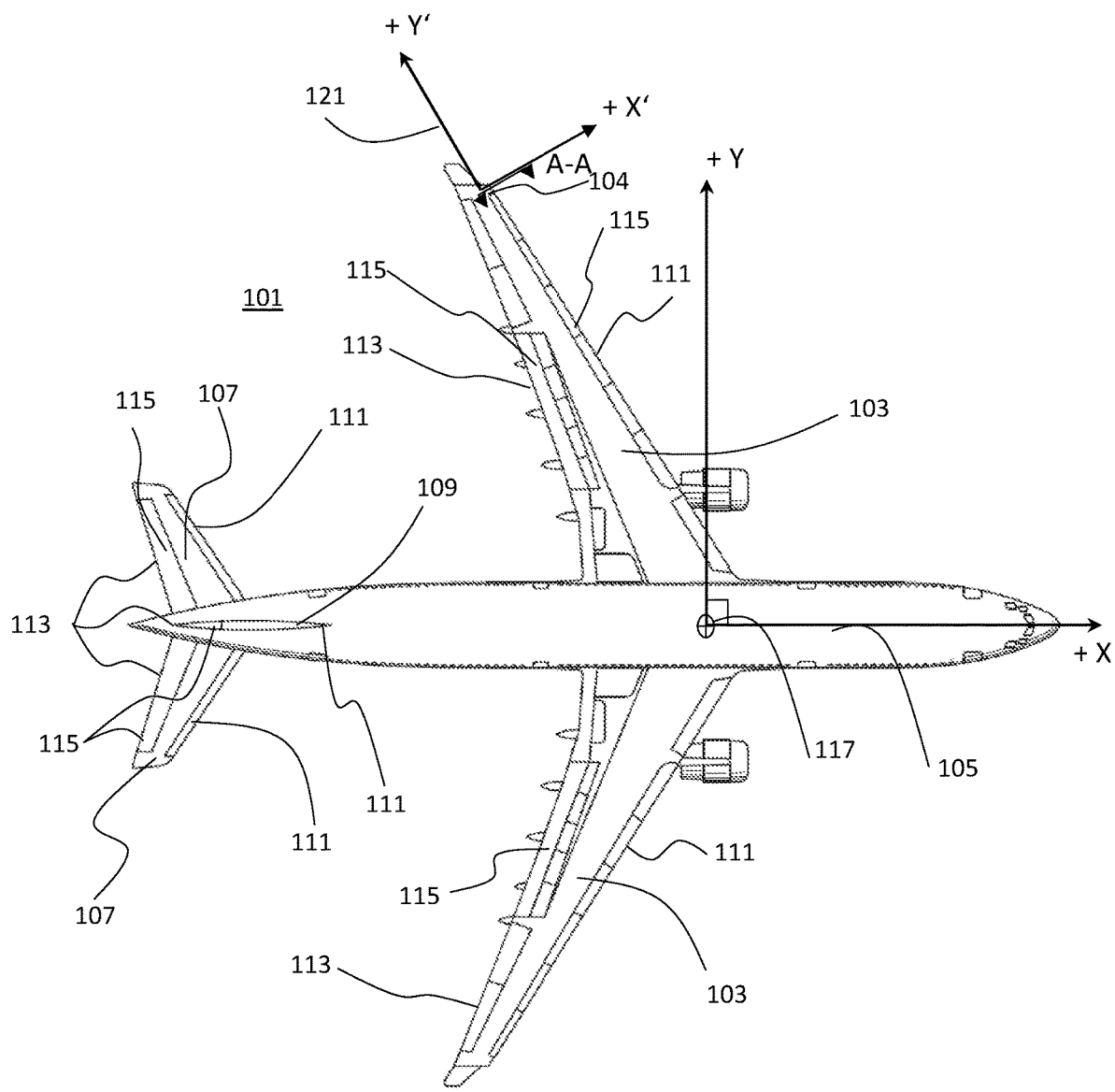
FIG. 1 shows a plan schematic view of a commercial aircraft.

With reference to FIG. 1, an aircraft 101 is shown with a wing 103 (also referred to as an airfoil) extending approximately horizontally through a fuselage 105. A further wing 107 (also referred to as the horizontal tail plane) extends approximately horizontally from either side of a rear portion of the fuselage 105. Yet a further wing 109 (also known as the vertical tail plane) extends vertically from an upper rear portion of the fuselage 105.

The wings 103, 109, 107 and the fuselage 105 may be formed of structural assemblies joined together by structural joints which function to restrain at least a pair of assemblies from moving relative to one another once the joints have been fastened, in other words the pair of assemblies are fixedly attached to one another. Each structural assembly may itself be formed of smaller structural assemblies joined together by a further number of joints.

The wings 103, 107, 109 each have a leading edge 111 and a trailing edge 113, and a set of movable high-lift or control elements 115, such a slats, flaps, ailerons, rudders and elevators, which are moveable (i.e., non-fixed) devices actuatable during operation between a deployed position and a retracted position according to the inputs of a controller. Adjacent, above or underneath each movable control element 115 and/or in the areas where no movables control elements 115 are provided, the leading edge and trailing edge structure of the wing 103 is fixed, i.e., not moving to function as a movable control element 115.

Geometrical characteristics of the aircraft 101 and its structural assemblies may be described with reference to a set of orthogonal principal aircraft axes X, Y and Z. The longitudinal axis (X) has its origin at the center of gravity 117 of the aircraft 101 and extends lengthwise through the fuselage 105 from the nose to the tail in the normal direction of flight. The lateral axis (Y) also has its origin at the center of gravity 117 and extends substantially crosswise from wingtip to wing tip. The vertical or normal axis (Z) also has its origin at the center of gravity and passes vertically through the center of gravity. A further pair of local axes are defined with reference to aircraft principal axes X, Y, Z for any portion of a given structural assembly. In the present example, a set of local axes X', Y', Z' is defined at a fixed leading edge structural assembly 104 located in proximity to the leading edge 111 of the wing 103. The first axis Y' lies in parallel to the principal XY plane at a swept angle (commonly referred to as the wing sweep angle) from the principal Y axis. This is may be referred to as the spanwise axis. The second axis X' again lies in parallel to the same XY plane and is perpendicular to the Y' axis at the point of its origin, which can be selected at any spanwise position, but in this case at a lower portion of the fixed leading edge structural assembly 104.

Figure 2:
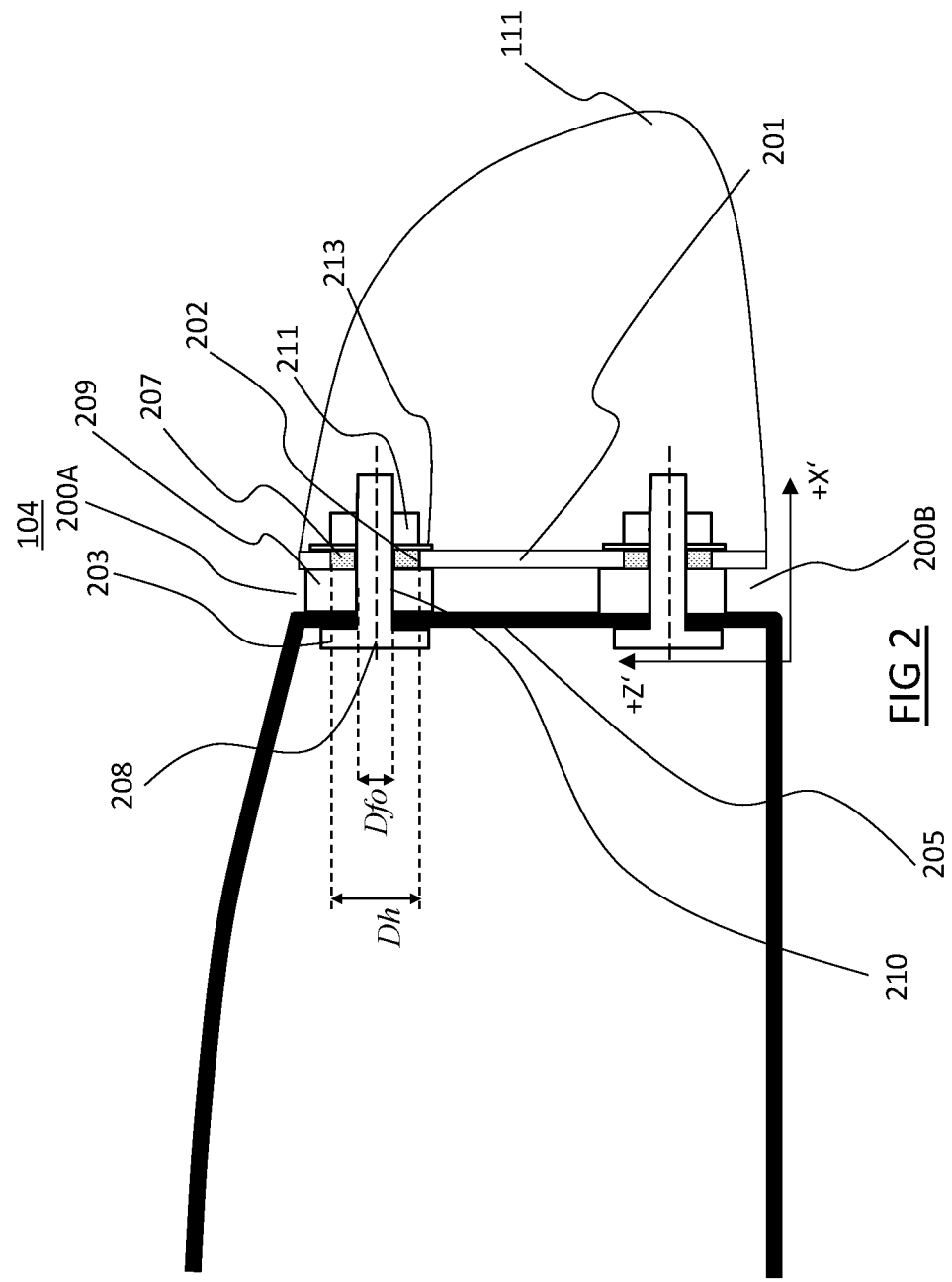
FIG. 2 shows a cross-section view through a wing structural assembly of FIG. 1 at the section A-A position shown, further showing a pair of identical aircraft joints.

With reference to FIG. 2, and according to an embodiment of the present technology, a section view is shown of a fixed leading edge assembly 104 at a spanwise A-A of FIG. 1 after completion of an assembly process.

The fixed leading edge assembly 104 comprises a first structural component 201 that is joined to a second structural component 205. The first and second components are spanwise extending in the Y' dimension over substantially the full span of the wing 103 and are manufactured from composite CFRP (carbon fiber reinforced polymer) material. At the position shown in FIG. 2 the components 201 and 205 are joined by a pair of joints 200A (upper), 200B (lower); however, it should be appreciated that further joints substantially the same as joints 200A, 200B are similarly provided at spanwise intervals along the spanwise length of the first and second components 201, 205. In the present example the first component 201 is a unitary, preassembled, structural module called a modular leading edge assembly and the second component 205 is a unitary wing box front spar member 205, however it should also be appreciated that the components 201, 205 may represent any plurality of structural components to be joined together to form any given structural assembly. It should also be appreciated that only one or more joints may be used for a given structural assembly, depending on the expected load transfer or failure design principle applied in the design of the assembly in question, e.g., Safe-life or fail-safe (multiple load path) design principles. Preferably the types of joints 200A, 200B are used for highly loaded structural assemblies similar to the fixed leading edge structural assembly 104 shown, for example, between an attachment component for a movable, or at the joint between the wings 103,107,109 and the fuselage 105.

In the present embodiment, at the location of each joint 200A 200B, the first component 201 is provided with an attachment hole 202 that is configured to receive a corresponding attachment fastener 203 provided by the second component 205, the attachment fastener 203 having a longitudinal fastener axis 208. Typically, the outer diameter Dfo of attachment fasteners 203 in such structures varies between 4 and 30 mm, however in the present embodiment of a modular leading edge assembly 104, the outer diameter Dfo is approximately 10 mm.

In the design of the assembly 104 and joint 200A/200B shown, the outer diameter Dfo is smaller in dimension than the diameter Dh of the hole 202, such that a first joining stage of the assembly process, when the first component 201 is first mounted to the second component 205, a gap 501 (see FIG. 5A for more detail) exists between the fastener 203 and the hole 202.

Due to the design of the components 201, 205 but also due to the design of the manufacturing process, dimensions of the gap 501 may be exacerbated due eccentricity (e.g., the degree of non-circular dimension) of the hole 202 as a result of incorrect forming of the hole 202 during manufacture of the first component 201 or as a result of the hole 202 being formed an incorrect position in the first component 201 relative to the position of the fastener 203. This is commonly referred to as an "out of tolerance" hole 202. Typically, the cross-sectional dimension of the gap can be between 0.5 mm and 6 mm, depending on the size of the hole 202 and its eccentricity.

In FIG. 2, the gap 501 is not apparent because it is occupied completely by a curable composite bush 207. The curable composite bush 207 is installed in a substantially pliable, uncured state between the hole 202 and the fastener 203 when the first and second components 201, 205 are in a desired fixed installation position relative to one another, such that the bush 207 is able to comply with the surfaces of the hole 202 and the fastener 203 (regardless of how irregular their shape is) and fill the gap 501.

Once this is achieved, the curable composite bush 207 is then cured to an extent such that its material stiffness is increased so as to prevent radial displacement of the attachment fastener 203 within the attachment hole 202 and to provide optimum seating and load transfer between the fastener 203 and the first component 201 and second component 205. A nut 215 and a washer 213 and are installed on the fastener 203 at each joint 200A, 200B such that the washer 213 engages the surface of the first component 201 and the cured bush 207. The nut 215 is threadably engaged and torqued so that a load bearing joint is formed between the first component 201 and the second component 205.

Use of a joint according to the present technology that incorporates a curable composite bush 207 in the way described allows for a structural assembly, and a manufacturing or assembly process that does not require the installation and machining of solid bushings, which is advantageous. It also ensures that each structural fastener is fully load carrying, which may also permit less conservative static load and fatigue load design assumptions in the design of the assembly, leading to a lighter structural assembly design of lower part count or of lower manufacturing and maintenance cost.

Use of such joints 200A, 200B, may further enable structural design and assembly philosophies that are more efficient and more tolerant for gaps 501 that may exist between the attachment elements 202, 203, of structural components 201, 205. It should be appreciated that the structural design or assembly 104 may incorporate a joint 200A, 200B, according to the present technology by design, rather than as a remedy to incidental out of tolerance holes. This may particularly beneficial to achieve a high rate manufacture of structural assemblies 104 particularly those where the type of material used for the components 201, 205, the dimensions of components 201, 205, or the number of components 201, 205 to be joined inherently leads to a high variance and incidents of gaps 501 that need to be tolerated in the design of the joint 200A, 200B. For example, this is particularly preferred in the assembly of large modular leading edge assemblies 104, as described with reference to FIG. 2.

Each joint 200A, 200B further comprises a third structural component 209 in the form of a solid donut shaped spacer of equal thickness in the X direction, and manufactured from CFRP composite material. The third component 209 may be manufactured using any suitably alternative material such as GFRP (glass fiber reinforced polymer), polymer, or metallic alloy material.

At each joint 200A, 200B, each third structural component 209 is configured to displace the first structural component 201 from the second structural component 205 in the +/−X' direction. It may also be configured to reduce the contact surface area between first component 201 and second component 205 such that load transfer is substantially provided through the attachment fasteners 203. It may be preferable that each component 209 may be machined or fettled to correct any misalignment between the first component 201 and the second component 205 in the direction mentioned. The third component 209 of each joint 200A, 200B may alternatively not be of the same dimension and that the third component 209 of each joint 200A, 200B may be machined differently, in order to achieve a desired correction in alignment between the first component 201 and the second component 205. As shown the third component 209 is provided with a hole 210 configured to receive a portion of the attachment fastener 203, such that it is supported in a radial direction i.e., perpendicular to the fastener axis 208, however such support may not be necessary.

Figure 3:
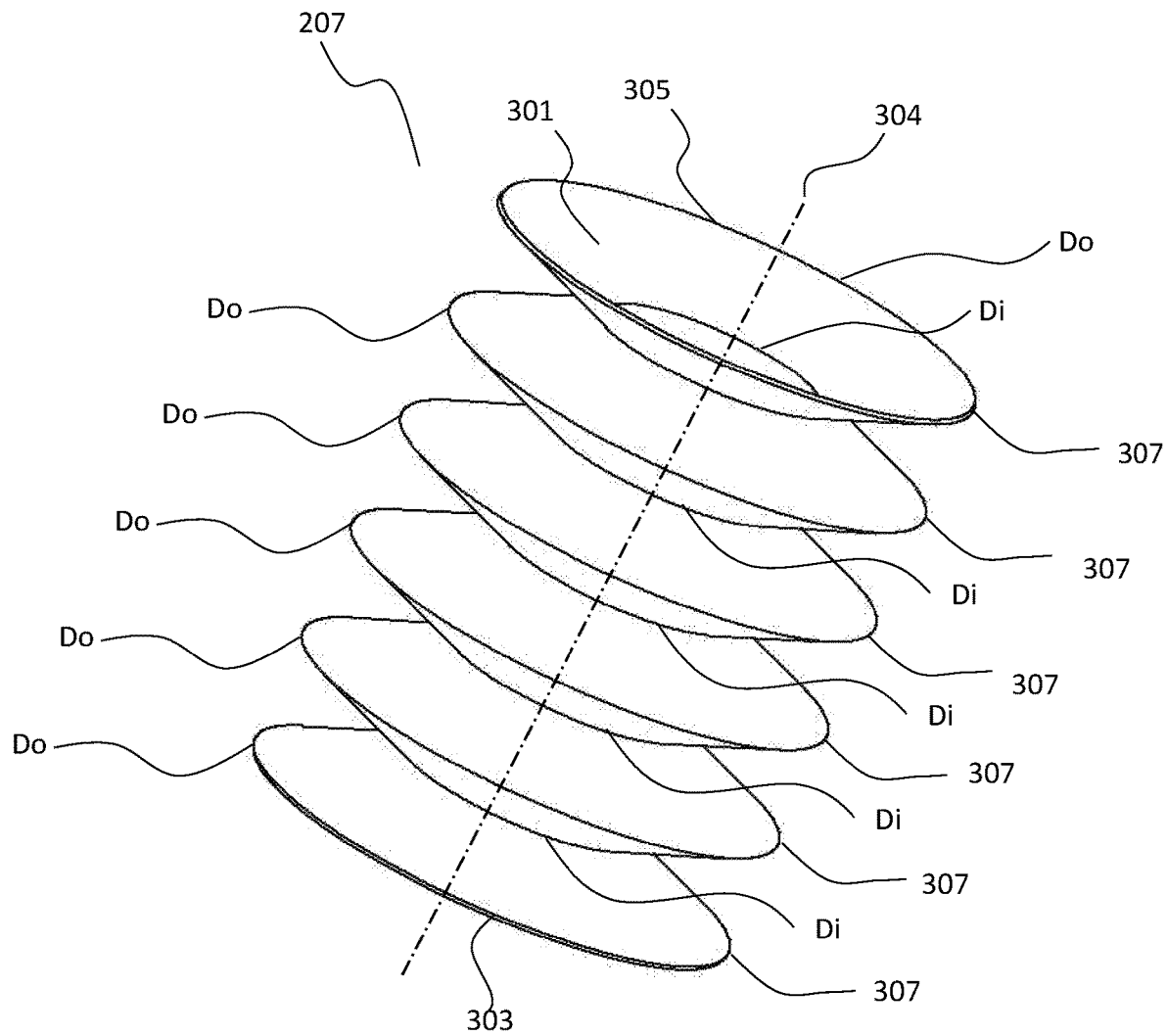
FIG. 3 shows an isometric perspective view of a curable composite bush.

With reference to FIG. 3, an exemplary curable composite bush 207 for use in either of the joints 200A, 200B of FIG. 2 is shown. The bush 207 is shown in an uncured state. The bush 207 is formed by an open ended, elongate, corrugated and generally cylindrical body 301. The corrugations 307 of the present embodiment are substantially chevron shaped. The body 301 further has a central longitudinal axis 304 that defines a center point for cross sections of the body 301 taken perpendicularly along the longitudinal axis 304. The body 301 is formed from a composite material composed of reinforcement material 303 pre-impregnated with a matrix material 302.

Figure 4A:
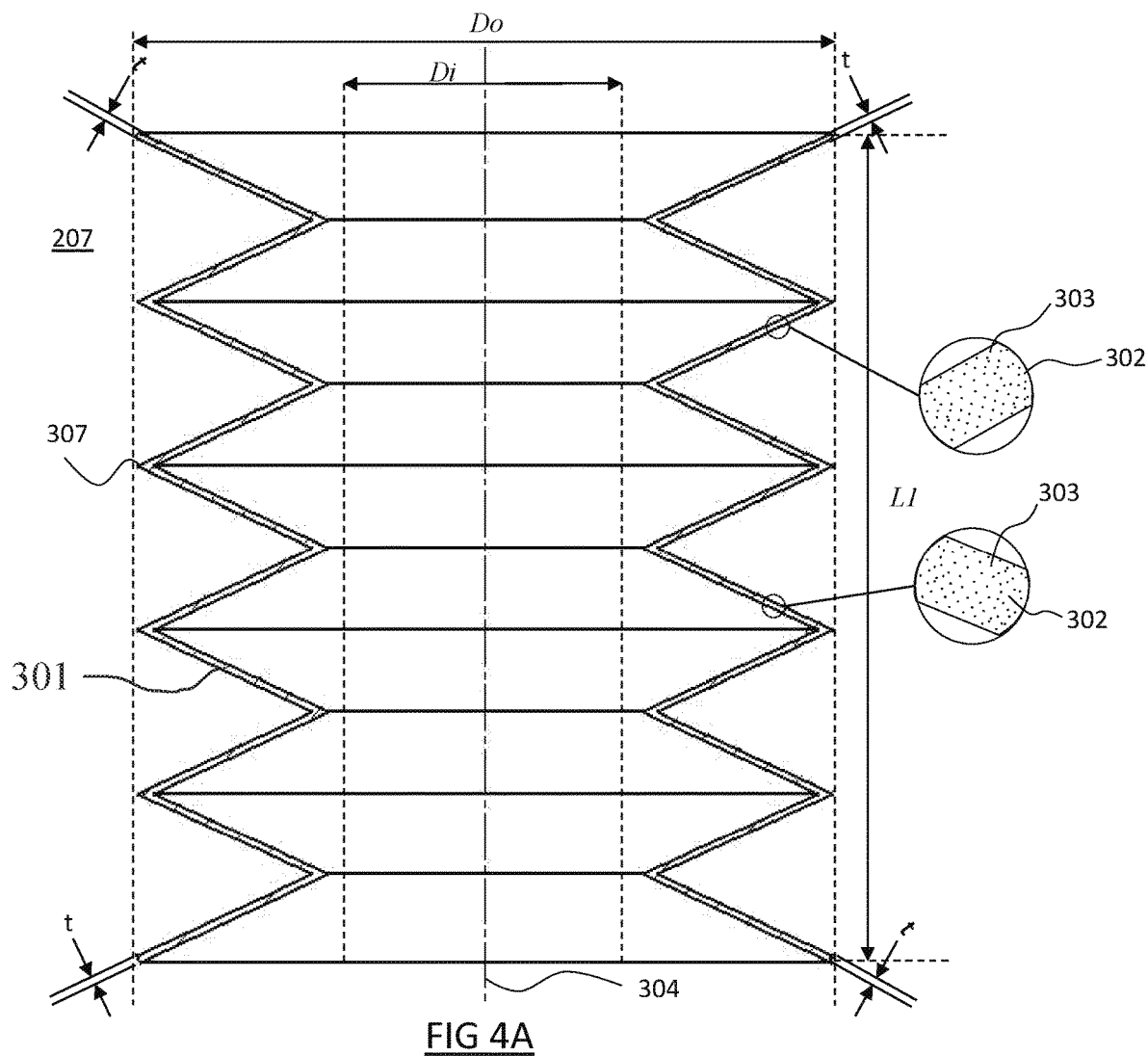
FIGS. 4A and 4B show schematic section views of embodiments of curable composite bush of FIG. 3, taken through the longitudinal axis of the bush, where the bush is in an uncompressed state.

With reference to FIG. 4A, a cross-section of the body 301 is shown. The cross-section lies on a plane formed by the longitudinal axis 304 and a line perpendicular to the axis 304.

The body 301 has a thickness t that is constant along its length L1. The thickness t of the present embodiment is approximately 0.5 mm. The reinforcement material 303 is formed of continuous fibers that are evenly distributed through the thickness t of the body 301 and along the length L1 of the body 301. The fibers are orientated substantially concentrically about the longitudinal axis 304 of the body 301, and are generally aligned in parallel with a circumference 305 of the body 301 at any cross-section of the body 301 viewed on a plane that is perpendicular to the axis 304.

A pair of exemplary magnified views V1, V2 is provided in order to demonstrate the distribution of the matrix material 302 and reinforcement material 303 along the length and thickness t of the body 301, as well as the orientation of the reinforcement material 302. The, ends of the fibers can be seen as dots, which is representative of their orientation.

The body 301 is of continuous cross-section with constant dimension values of an outer diameter Do and an inner diameter Di, respectively. However, the body 301 may vary in cross-sectional dimensions along its length L1. For example, the body 301 may be tapered from one end to the other end. The cross-section used may alternatively be elliptical, square, triangular or any combination thereof, as required to suit the characteristics of the attachment hole.

Chevron shaped corrugations 307 define the inner diameter Di and the outer diameter Do of the bush 207 and are configured allow the bush 207 to be compressed and allow the body 301 to collapse in the direction of the longitudinal axis 304 such that the corrugations 307 overlap in series, when the bush 207 is compressed along the axis 304. The inner diameter Di is dimensioned to substantially the same dimension of the outer diameter Dfo of the attachment fastener 203, to which the bush 207 is to be applied. Chevron shaped corrugations are preferable as they permit the highest packing density and most even distribution of fibers both radially from, and in parallel to, the axis 304 when the bush 207 is brought into a compressed state, thus ensuring more even mechanical stiffness properties through the bush 207, when it is installed and cured in an attachment hole.

Figure 4B:
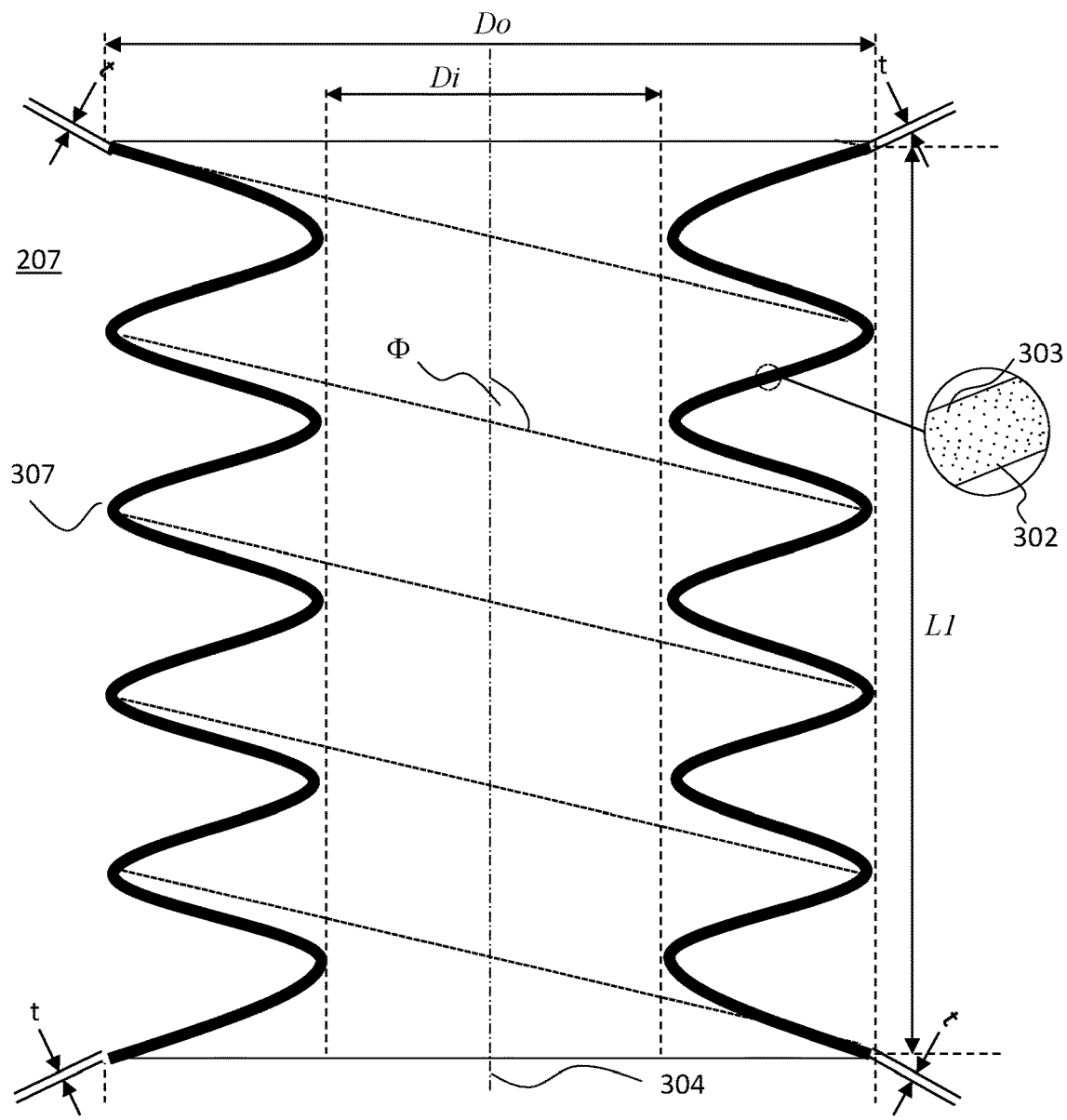

With reference to FIG. 4B, an alternative embodiment of the present technology is shown. A bush 207 substantially in accordance with the previous embodiment comprises the same length L1, thickness t, material types and inner and outer diameters, Di, and Do. However, in the present embodiment, the corrugations 307 have a sinusoidal profile. This may be preferable over alternative shapes such as chevron shaped corrugations 307, because sinusoidal corrugations 307 may be less prone to point damages and may be easier to manufacture, even though they may result in a less evenly distributed fibers when the bush 207 is brought into a compressed state.

Furthermore, the corrugations 307 are defined continuously at a non-perpendicular angle 1 to the longitudinal axis, such that the corrugations 307 extend in the form of a helix along the length L1 of the curable composite bush 207. This helix may equally be provided for the previously described chevron shaped corrugation or for any suitable alternative corrugation shape that is capable of being provided in a helical 3D form. The helical form may be preferable to enable the bush 207 to be manufactured using a continuous extrusion process.

Figure 4C:
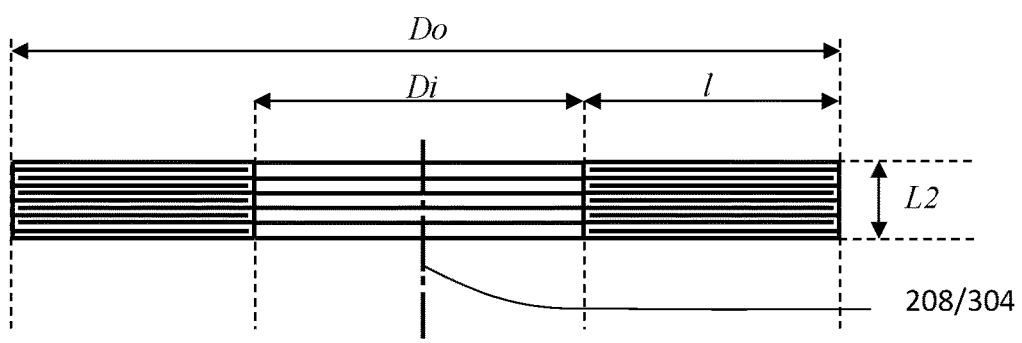
FIG. 4C shows schematic section view of the embodiments of curable composite bush of FIGS. 3, 4A, and 4B, taken through the longitudinal axis of the bush, where the bush is in a compressed state.

With reference to FIG. 4C; a cross-section is shown of the curable composite bush 207 of FIGS. 4A and 4B in a compressed and cured state, which is the state of the bush 207 that fills the gap shown in FIG. 2. In the cured state of FIG. 2, the axis 208 of the fastener 203 aligns concentrically to the axis 304 of the bush 207, such that the values of the outer diameter Dfo and the inner diameter Di are substantially the same. The corrugations 307 substantially overlap in series when the bush 207 is compressed to a compressed length L2, such that the outer diameter Do of the bush 207 and the diameter Dh of the hole 202 are also the substantially same dimension. A half-length l, defines the radial dimension of overlap with respect to the longitudinal axis 304 of the bush, which in the present example is 3 mm.

The matrix material 302 used in the bush 207 of FIGS. 3, 4A and 4B is Polyetheretherketone (PEEK); a thermoplastic matrix material, however any other suitable thermoplastic matrix material may alternatively be used such as polyethersulfide (PES), polyetherimide (PEI), or polyphenylenesulfide (PPS). For the purpose of this description, a curable composite bush 207 formed in part from a thermoplastic matrix material 302 is said to be in a "cured" state, when the temperature of the thermoplastic matrix material 302 is brought below its applicable melting temperature and the bush 207 is in a compressed state. It is said to be in an "uncured" state when the temperature of the thermoplastic matrix material 302 has reached or is above its applicable melting temperature and/or the bush 207 is in a decompressed or noncompressed state.

The body 301 may alternatively be formed from a reinforcement material 303 pre-impregnated with a partially or non-polymerized thermosetting matrix material 302, chosen from one of matrix materials commonly used in aerospace such as polyester, epoxy, vinylester, bismaleimide, phenolic or polyimide. For the purpose of this description, a curable composite bush 207 formed in part from a thermoset matrix material 302 is said to be in a "cured" state, when the bush 207 is deformed in a compressed state and the matrix material 302 polymerized such that bush 207 is irreversibly deformed.

The reinforcement material 303 in the present embodiment is composed of continuous glass fibers of alumina borosilicate glass otherwise known as 'E-glass', however any other suitable continuous glass fiber reinforcement may be used, for example S-Glass. In addition, a reinforcement material 303 using other material types may be used such as graphite/carbon type fibers or aramid type of fibers. Continuous fibers are preferable because during compression of the bush 207 their length ensures that they remain oriented substantially concentrically about the longitudinal axis 304 of the body 301 in parallel with a circumference 305 of the body 301, which would not be the case for short fibers, which may re-orientate and ultimately hinder the collapse of the bush 207 in a desired way. Furthermore, once compressed within the gap 501, the continuous fibers will remain generally aligned and will interact so that composite material is evenly distributed between the hole 202 and fastener 203 when compressed.

Use of a thermoplastic matrix material 302 may be preferable as it allows the curable composite bush 207 to be handled, stored more easily during assembly operations when the matrix material of the bush 207 is below its applicable melting temperature, as shown in FIGS. 3 and 4A, and is resiliently deformable. In this state, the bush 207 is less prone to unintentional damage, and can be handled more easily, than a curable composite bush 207 with a body 301 formed from a reinforced, partially cured thermoset resin matrix material 302, for example.

It may also be advantageous to use a thermoplastic matrix material 302 as it does not require special storage and shelf life considerations that could be necessary were the body 301 to be formed using a partially cured thermoset resin matrix material 302, which have a pre-determined shelf life and may require cooling to provide a usable shelf-life in an assembly line Lastly, disassembly of the joint 200A, 200B may be required at some point in the aircraft's life cycle, and it is foreseen that removal of the bush 207 by application of heat is easier than application of machining, which would be required for removing a thermosetting type of bush 207.

That said, use of a thermosetting matrix material 302 may in some instances be preferable, particularly where a matrix material with higher mechanical performance properties is required or where a matrix material 302 with irreversible properties is required due to a high temperature environment of the joint 200.

The use of E-glass fibers as a matrix material 302 may be advantageous as they have higher compression strength properties when compared to alternative high performance fibers, which may alternatively be used in aircraft structure, for example carbon fiber or aramid fiber. Furthermore, glass fibers are galvanically compatible with a wider range of structural materials commonly used in in aircraft joints, for example, titanium or aluminum alloy.

It should be appreciated, that the volume ratio of reinforcement material 303 to matrix material 302 may be varied depending on the specific mechanical stiffness and strength properties required from the bush 207 when it is compressed and cured in a joint 200A, 200B. Furthermore, mixtures of different type of reinforcement material 303 including fibers may be used, if required. An uneven distribution of the reinforcement material 303 may also be used and tailored to suit the principal load direction and levels between the attachment fastener 203 and attachment hole 202.

Figure 5A:
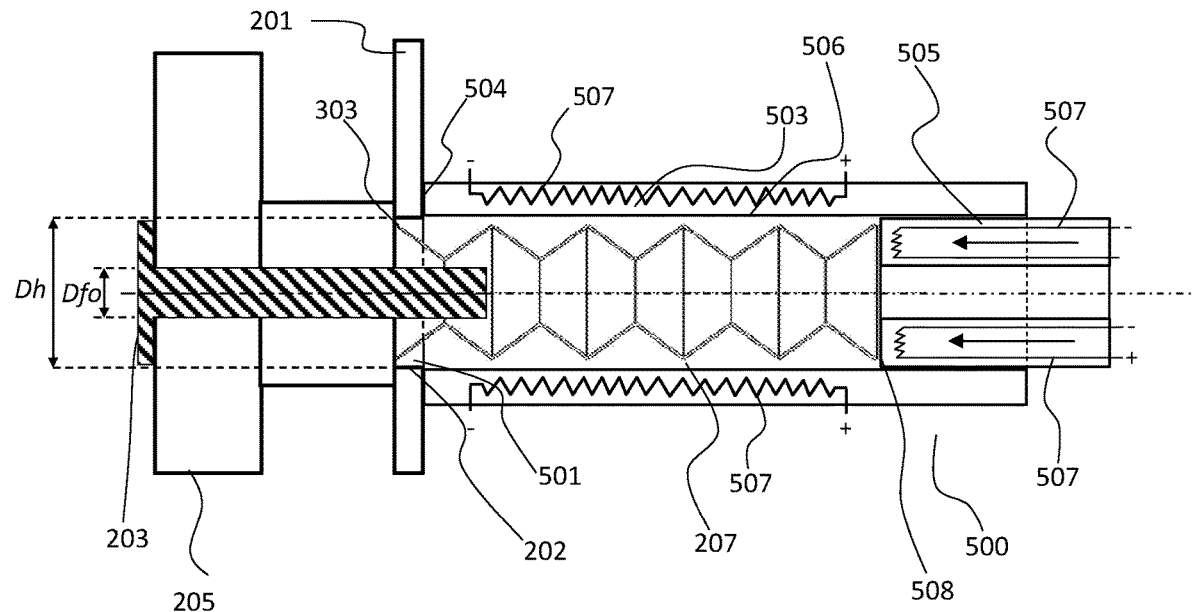
FIGS. 5A and 5B shows an aircraft joint of FIG. 2 at a first joining stage and a second joining stage, respectively, using a curable composite bush and an installation tool.
Figure 5B:
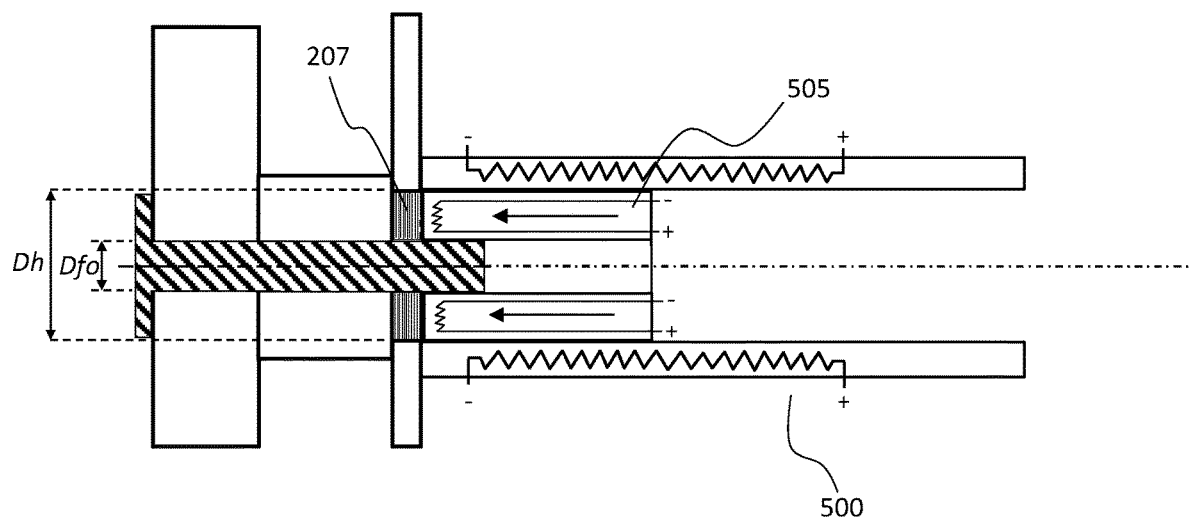

With reference to FIGS. 5A and 5B, attachment of a first component 201 to a second component 205 is shown using a curable composite bush 207.

In FIG. 5A, a first joining stage shows the first component 201 held in an installation position relative to the second component 205, such that the attachment fastener 203 is inserted in the attachment hole 202, which creates a gap 501 between the fastener 203 and the hole 202. A first end 303 of a curable composite bush 207 in accordance with the bush described in FIGS. 3, 4A and 4B, is then introduced into the gap 501 between the outer diameter Dfo of the fastener and the diameter Dh of the hole 202, i.e., it is inserted over the exposed end of the fastener 203.

A tool 500 for installing the bush 207 comprising a guide 503 and a compactor 505 is positioned in proximity to the bush 207. The guide 503 and compactor 505 each comprise a body formed from steel and shaped as an open-ended cylinder. An end surface 504, defined by the guide 503, is substantially planar and has an inner diameter substantially the same as the diameter Dh of the hole 202. The end surface 504 is configured to comply with an exterior surface of the first component 201 in proximity to the hole 202 such that the guide 503 can be steadily held in position by a user.

An inner surface 506 of the guide 503 is configured to be substantially smooth and polished and may comprise a non-stick treatment. The inner surface 506 is configured so as to contact the bush 207 in order to ensure that it stays substantially cylindrical in form and orientated in the direction of its longitudinal axis 304 as the bush 207 is compressed into the gap 501. The inner surface 506 of the guide 503 is further configured to guide the compactor 505 in a direction substantially parallel to the longitudinal axis 304 of the bush 207.

A further end surface 508, defined by the compactor 505, is substantially planar and has an inner diameter substantially the same as the outer diameter Dfo of the fastener 203 and an outer diameter substantially the same as the diameter Dh of the hole 202. The compactor 505 is configured to slide within the guide 503 and to compact the curable composite bush 207, at the further end 508, into the gap 501 between the attachment fastener 203 and an attachment hole 202, such that the bush 207 substantially conforms to the dimensions of the gap 501. The use of the compactor 505 helps to ensure that compression pressure is evenly applied by the compactor 505 at its further end surface 508 to the bush 207. The combination of the presently described compactor 505 and guide 503 is also advantageous as the relative displacement of the compactor 505 relative to the guide 503 may be used to determine the degree of compression of the bush 207 within the gap 501. As such the amount of bush material compacted within the gap 501 can be derived from such measurements.

In the present example, the curable composite bush 207 is formed partially of thermoplastic material 302, therefore heating means are provided in the form of electrical heating elements 507 embedded with the guide 503 and separately with the compactor 505. Electrical heating elements 507 may be preferable as they are easier to control than other means, such as liquid heating. Embedding the heating element 507 avoids any interference between the smooth inner surface 506 of the guide 503 and the bush 207 and reduces the likelihood of collecting contaminants that may be transferred between the tool 500 and the bush 207. Such contaminants are undesirable as they may affect the curing of the bush 207 and may also pose a fire risk when heating is applied.

It may alternatively be sufficient to attach the heating elements 507 to a surface portion of the guide 503 or compactor 505. The heating means 507 may be activated once the bush 207 is positioned as shown within the gap 501, before compacting of the bush 207 is started. Heating means 507 may only be needed to be provided in the guide 503 or the compactor 505.

Once the bush 207, guide 503 and compactor 505 are put into the position shown in FIG. 5A, the compactor 505 is moved towards the fastener 203 to compress the bush 207 into the gap 501 in a second joining stage, so that no gap 501 exists thereafter, as shown in FIG. 5B. The curable composite bush 207 is then held in the compressed state shown in FIG. 5B until it is cured. The tooling 500 is then removed. In the cured state, the bush 207 prevents radial displacement of the attachment fastener 203 within the attachment hole 202. In the case of installing a bush 207 partially formed from a thermoplastic matrix material 302, the bush 207 is heated by the heating means 507 before the compactor 505 is moved towards the fastener 203 into order to bring the curable composite bush 207 into a melted pliable state, after which the compactor 505 can be moved to compress the bush 207 into the gap 501. In the case of installing a bush 207 partially formed from a thermosetting matrix material 302, heating means 507 may also be applied in order to accelerate the polymerization of the matrix material, which may be desirable in high joining rate applications.

Figure 6A:
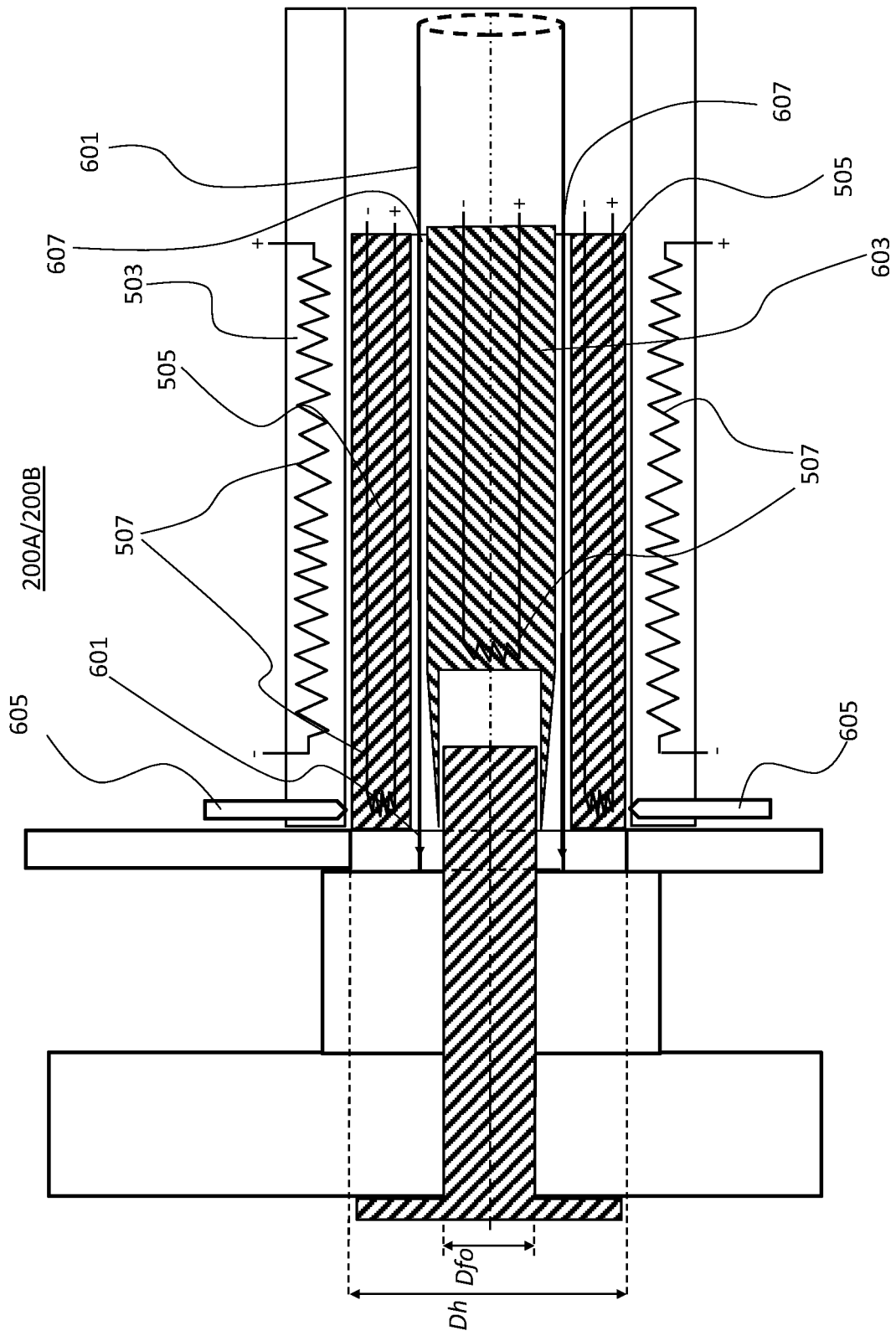

It should be appreciated for the embodiments so far described that, for certain applications the corrugations 307, may not be required and that the material properties of the bush, particularly its pliability, in response to heat application may suffice for feeding a bush into a gap 501. With reference to FIGS. 6A and 6B, an exemplary curable composite bush 601 without corrugations is provided as well as a tool 600 for installing it. The joint 200A/200B and tool 600 shown in FIGS. 6A and 6B are substantially in accordance with the previous embodiment shown in FIGS. 5A and 5B, however the bush 601 is different in form than previously provided and the tool 600 has an additional second guide 603 fitted with a deployable radial cutter 605.

The curable composite bush 601 comprises a continuous tube of substantially circular cross-section and has a body 301 in the form of an un-corrugated cylinder. The body 301 of the bush 601 is composed of a thermoplastic matrix material 302 pre-impregnated with continuous fibers of a reinforcement material 303, that are orientated about the longitudinal axis 304 of the body 301, and are generally aligned in parallel with a circumference 305 of the body 301 at any cross-section of the body 301 when viewed on a plane that is perpendicular to the axis 304.

In FIG. 6A, in a first joining stage the first component 201 is shown held in an installation position relative to the second component 205, such that the attachment fastener 203 is inserted in the attachment hole 202, which creates a gap 501 between the fastener 203 and the hole 202. The second guide 603 is slideably engaged to the fastener hole 202. The second guide 603 is cylindrical with an outer diameter at an end furthest from the fastener 202 that has a diameter smaller than inner diameter of the compactor 505, such that a radial channel 607 exists between the second guide 603 and the compactor 505. The outer diameter of the second guide 603 reduces towards the attachment end to the fastener 203 such that a taper is provided. The second guide is formed from steel, has a smooth, polished and non-stick surface, and is provided with heating means 507 in the form of a single embedded heating element 507. Once the second guide 603 is attached to the fastener, the guide 503 and compactor 505 are then positioned. Then, a first end of a curable composite bush 601 as described is fed around the second guide 603 and into the channel 607.

With reference to FIG. 6B, once the bush 601, guide 503 and compactor 505, and second guide 603 are put into position shown in FIG. 6A, a second joining stage ensues wherein the bush 601 is heated to a temperature approximately equal to or above the melting temperature of the thermoplastic material. Simultaneously or thereafter, the bush 601 is fed between the outer diameter Dfo of the fastener and the diameter Dh of the hole in the channel 607 towards the fastener 203 and into the gap 501, until sufficient material is introduced to remove the gap 501. The compactor 505 may then be moved into and out of engagement with the compressed curable composite bush 601 to ensure it has been sufficiently compressed into the gap 501. The bush 601 is then left to "cure," e.g., cool below its melting point in the compressed state, such that in the cured state shown in FIG. 6B, the bush 601 prevents radial displacement of the attachment fastener 203 within the attachment hole 202. Once the bush 601 is cured, the compactor 505 is withdrawn away from the fastener 203 and the radial cutter is deployed to cut the unused portion of bush 601, before the tool 600 is then removed.

With reference to FIGS. 5A, 5B, 6A, and 6B, it should be appreciated that the heating means 507 for the tooling 500, 600 may be provided by other suitable means. A heating means 507 may instead be provided by a heated gas jet device attached at the othermost end of the guide 503. A heated gas jet device may be preferable as it may use less energy and provide a better heat distribution to the curable composite bush 207. Alternatively, heating means 507 may be provided by an ultrasonic energy emitting device attached to the tool. Use of an ultrasonic energy emitting device may be used to direct ultrasonic wave energy to heat the material of the bush 207 and remove imperfections within it, when the material of the bush 207 is in a more pliable state.

Alternatively, heating means 507 may be provided by electrical induction of the fastener 203 or fibers of the reinforcement material 303, using an electrical inducting device. Such an alternative embodiment may be preferable where access to the bush 207 is particularly problematic.

Figure 7:
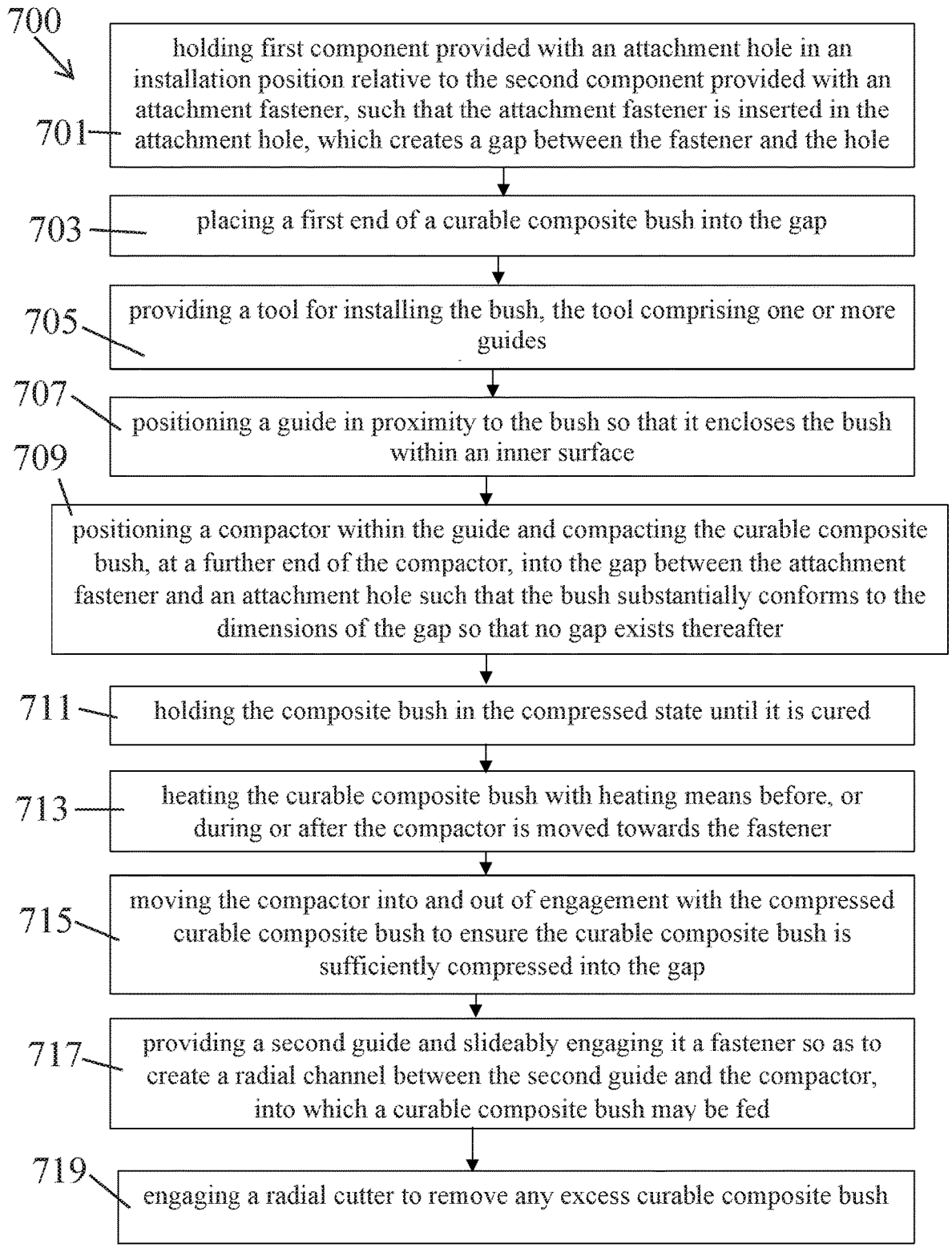
FIG. 7 shows a method of forming an aircraft joint of a structural assembly.

With reference to FIG. 7, a method 700 of joining a first aircraft structural component to a second aircraft structural component is provided, the method comprising the steps of: 701—holding first component 201 provided with an attachment hole 202 in an installation position relative to the second component 205 provided with an attachment fastener 203, such that the attachment fastener 203 is inserted in the attachment hole 202, which creates a gap 501 between the fastener 203 and the hole 202; 703—placing a first end of a curable composite bush 207 into the gap 501; 705—providing a tool 500 for installing the bush 207, the tool 500 comprising one or more guides 503, 603 and a compactor 505; 707—positioning a guide 503 in proximity to the bush 207 so that it encloses the bush 207 within an inner surface 506; 709—positioning a compactor 505 within the guide 503 and compacting the curable composite bush 207, at a further end 508 of the compactor 505, into the gap 501 between the attachment fastener 203 and an attachment hole 202 such that the bush 207 substantially conforms to the dimensions of the gap 501 so that no gap 501 exists thereafter; 711—holding the composite bush 207 in the compressed state until it is cured.

The method may further comprise the steps of: 713—heating the curable composite bush 207 with heating means 507 before, or during or after the compactor 505 is moved towards the fastener 203; 715—moving the compactor 505 into and out of engagement with the compressed curable composite bush 207 to ensure the curable composite bush 601 is sufficiently compressed into the gap 501; 717—providing a second guide 603 and slideably engaging it a fastener 203 so as to create a radial channel 607 between the second guide 603 and the compactor 505, into which a curable composite bush 601 may be fed; and 719—engaging a radial cutter to remove any excess curable composite bush 601.

Where in the foregoing description, integers or members are mentioned which have known, obvious or foreseeable equivalents; then such equivalents are herein incorporated as if individually set forth. Reference should be made to the claims for determining the true scope of the present technology, which should be construed so as to encompass any such equivalents. It will also be appreciated by the reader that integers or features of the technology that are described as preferable, advantageous, convenient or the like are optional and do not limit the scope of the independent claims. Moreover, it is to be understood that such optional integers or features, while of possible benefit in some embodiments of the technology, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A curable composite bushing for an aircraft joint comprising:
   a generally hollow cylindrical body formed from a matrix material impregnated with a reinforcement material substantially composed of fibers,
   the fibers being oriented in a generally circumferential direction about a longitudinal axis of the bushing,
   wherein the bushing is not fully cured,
   wherein the body defines a plurality of corrugations extending between an inner and an outer diameter of the bushing, and
   wherein the corrugations improve a compressibility of the bushing in a direction substantially collinear to the longitudinal axis of the bushing.

2. The composite bushing according to claim 1, wherein the reinforcement fibers are formed from a glass fiber material.

3. The composite bushing according to claim 2, wherein the reinforcement fibers are formed from E-glass fiber material.

4. The composite bushing according to claim 1, wherein the inner diameter of the bushing in an uncompressed state is between 4 mm and 30 mm.

5. The composite bushing according to claim 4, wherein the inner diameter is approximately 10 mm.

6. The composite bushing according to claim 1, wherein the corrugations are substantially chevron shaped in an uncompressed state.

7. The composite bushing according to claim 1, wherein the corrugations are substantially sinusoidal shaped in an uncompressed state.

8. The composite bushing according to claim 1, wherein one or more of the corrugations extends in a form of a helix along a length of the curable composite bushing.

9. The composite bushing according to claim 1, wherein a cross section of the bushing varies along a length of the bushing.

10. The composite bushing according to claim 1, wherein the matrix material substantially comprises a thermoplastic material.

11. The composite bushing according to claim 1, wherein the matrix material substantially comprises a thermoset material.

12. The composite bushing according to claim 1, wherein the reinforcement fibers are substantially continuous.

13. The composite bushing according to claim 1, wherein the reinforcement fibers are substantially discontinuous.

14. The composite bushing according to claim 1, wherein the reinforcement material comprises fibers of more than one type of reinforcement fiber material.

15. The composite bushing according to claim 1, wherein the reinforcement fibers are evenly distributed throughout the body of the composite bushing.

16. The composite bushing according to claim 1, wherein the reinforcement fibers are formed from a graphite fiber material.

17. The composite bushing according to claim 1, wherein the reinforcement fibers are formed from an aramid fiber material.

18. The composite bushing according to claim 1, wherein a half-length of the corrugation in an uncompressed state is between 0.5 mm and 3 mm.

19. The composite bushing according to claim 1, comprising a thickness of approximately 0.5 mm.

* * * * *